United States Patent [19]

Gieber

[11] Patent Number: 4,461,414

[45] Date of Patent: Jul. 24, 1984

[54] AUTOMATIC SELF-LOCKING ROOF RACK

[76] Inventor: Günter Gieber, Defreggerstr. 6, A-3300 Amstetten, Austria

[21] Appl. No.: 495,760

[22] Filed: May 18, 1983

[30] Foreign Application Priority Data

May 18, 1982 [AT] Austria ................................ 1956/82

[51] Int. Cl.$^3$ .............................................. B60R 9/04
[52] U.S. Cl. .................................. 224/315; 224/324; 224/331
[58] Field of Search ............... 224/324, 315, 322, 323, 224/329, 331

[56] References Cited

U.S. PATENT DOCUMENTS

| | | | |
|---|---|---|---|
| 3,132,780 | 5/1964 | Binding | 224/315 |
| 3,348,747 | 10/1967 | Vuarchex | 224/315 |
| 4,166,560 | 9/1979 | Werner et al. | 224/315 |
| 4,326,654 | 4/1982 | Frey | 224/315 |
| 4,401,247 | 8/1983 | Zoor | 224/322 X |

FOREIGN PATENT DOCUMENTS 2548675 5/1977 Fed. Rep. of Germany ...... 224/331

*Primary Examiner*—Steven M. Pollard
*Attorney, Agent, or Firm*—Karl F. Ross; Herbert Dubno

[57] ABSTRACT

A roof rack securable to the rain gutters of a motor-vehicle roof above the door openings has a leg subassembly with a support, a leg standing in the gutter above the respective door opening and carrying the support, and the leg is secured to the respective gutter. A holddown member is pivoted on the support and displaceable between a locking position close to same for securing an object to the support and a freeing position spaced from the support. A locking element extends into the respective door opening underneath the leg and is vertically displaceable relative thereto between an upper position relatively close underneath the respective gutter and a lower position spaced downward therefrom. Thus the locking element can only move into the respective lower position when the respective door is not closed in the respective door opening. A latch is provided including formations engageable in the upper position of the locking element and connected to the holddown member for preventing displacement of same into the freeing position except when the locking element is in the lower position.

16 Claims, 27 Drawing Figures

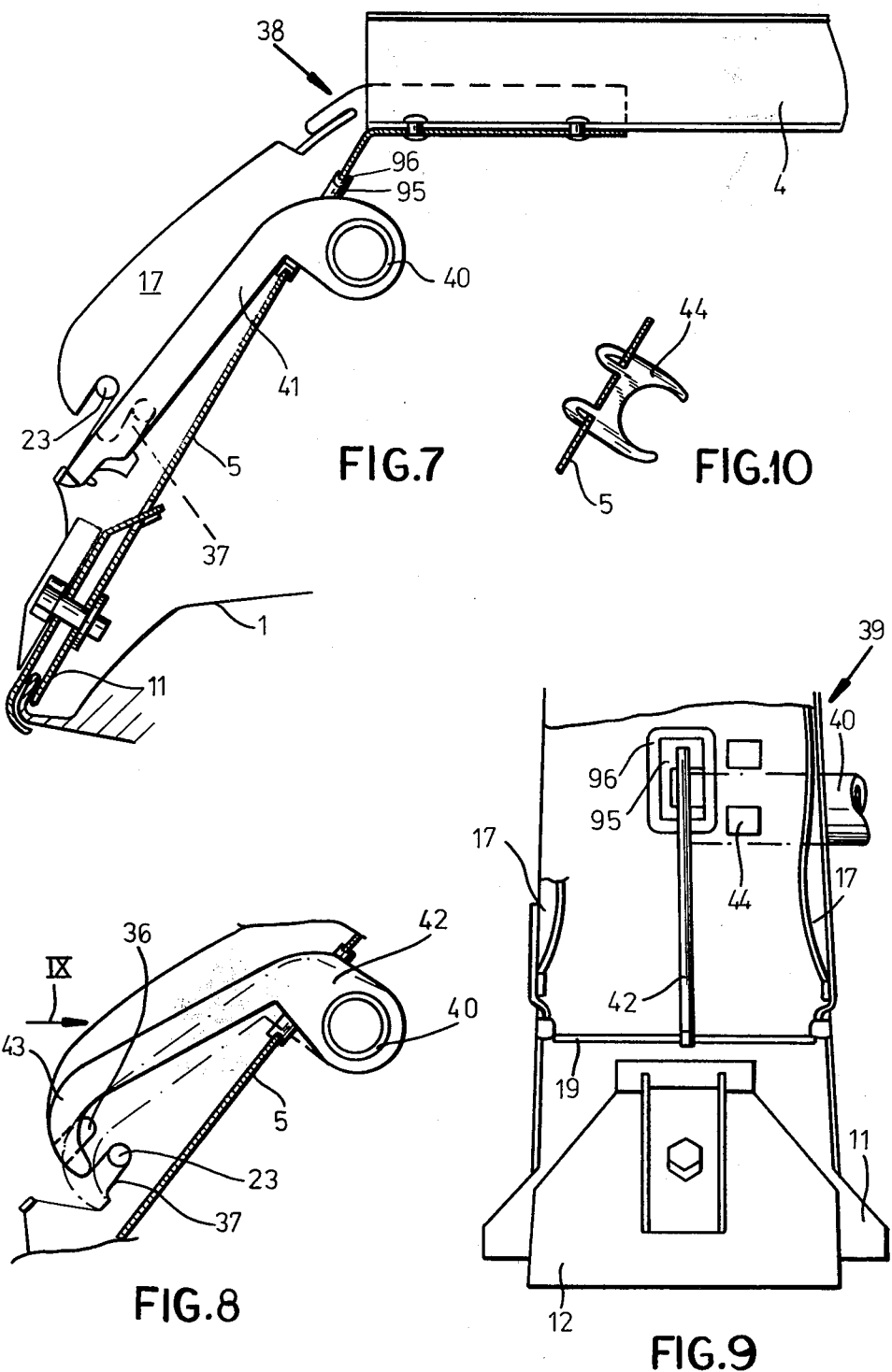

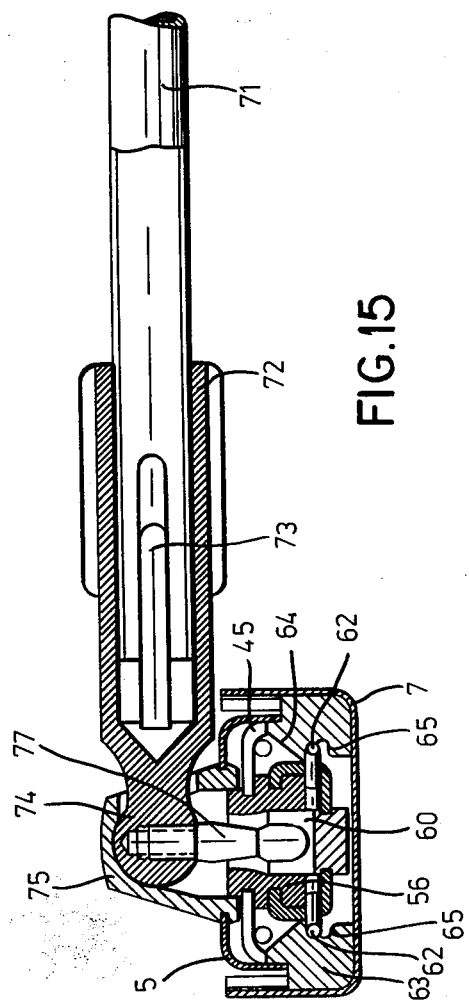

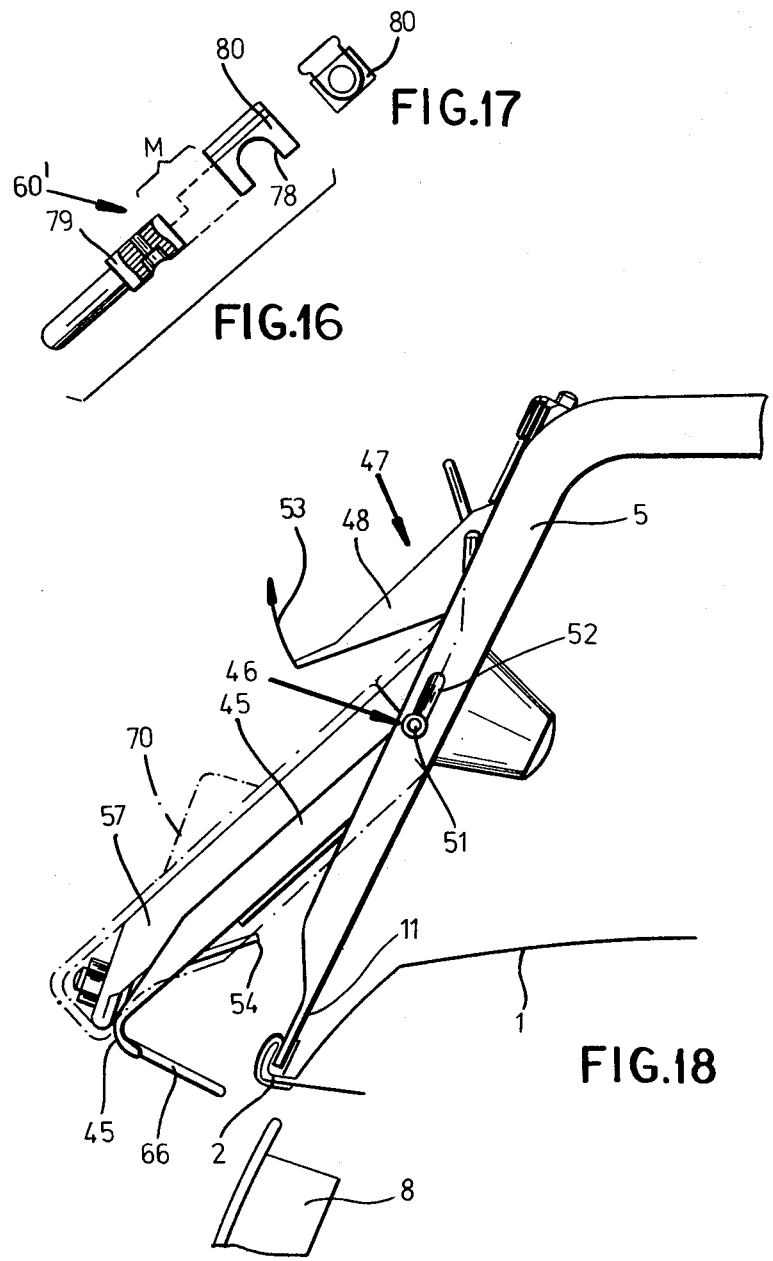

AUTOMATIC SELF-LOCKING ROOF RACK

FIELD OF THE INVENTION

The present invention relates to a roof rack. More particularly this invention concerns such a rack used to carry freight, such as skis or a container, atop a motor vehicle, normally a passenger car.

BACKGROUND OF THE INVENTION

It is standard practice to carry bulky items such as skis on a roof rack atop a passenger motor vehicle. Such a rack normally has a lower support rail on which the skis lie, and one or more upper pivotal rails that can be swung down to clamp the skis against this lower rail. Two such racks spaced in the travel direction are provided on the roof of the vehicle secured to the rain gutter to securely hold the skis in place. Similar such racks are also used to haul bulkier objects, and are even built right into rooftop containers.

A particular problem with any type of roof rack, in particular ski racks, is that the items held by the rack are easily stolen. Securing the skis, for example, to the rack with a padlock is only a partial deterrent to theft, since it is common for the entire rack to be taken with the objects secured in it.

Accordingly it is standard practice to mount the racks securely by fasteners requiring the use of tool to the vehicle to make theft of the entire rack difficult, so the freight can be locked to the rack. Such an expendient also makes it difficult for the user to put on and take off the vehicle.

A ski rack is known having hasps at the ends of the clamping rails, or even a separate lock cylinder and mechanism on each clamping rail. Such a rack is quite expensive to manufacture, especially when heavy-duty robust locks are employed. In addition opening and closing it is a chore, and the locks frequently freeze up or get fouled, due to their exposure atop the car.

OBJECTS OF THE INVENTION

It is therefore an object of the present invention to provide an improved roof rack.

Another object is the provision of such a roof rack which overcomes the above-given disadvantages, that is which can be opened and closed rapidly and easily, and that nonetheless cannot be removed from the vehicle or opened when locked without substantially destroying it.

SUMMARY OF THE INVENTION

These objects are attained according to the instant invention in a roof rack securable to the rain gutters of a motor-vehicle roof above the door openings and having a leg subassembly with a support, a leg standing in the gutter above the respective door opening and carrying the support, and means on the leg for securing same on the respective gutter. A holddown member is pivoted on the support and displaceable between a locking position close to same for securing an object to the support and a freeing position spaced from the support. A locking element extends into the respective door opening underneath the leg and s vertically displaceable relative thereto between an upper position relatively close underneath the respective gutter and a lower position spaced downward therefrom. Thus the locking element can only move into the respective lower position when the respective door is not closed in the respective door opening. Latch means is provided including formations engageable in the upper position of the locking element and connected to the holddown member for preventing displacement of same into the freeing position except when the locking element is in the lower position.

With this system, therefore, the rack can only be opened up to free the skis or other objects being carried when the vehicle door is open. Since only a person with a key for the door, presumably an authorized person, can open the vehicle door, this means that the skis are safe from theft by anyone who does not have the car key. Not only is such a system very secure, but it also eliminates the need to memorize a combination or carry an extra key. What is more the mechanism can be relatively simple and wholly enclosed so that it will not freeze up or get fouled readily.

The securing means according to this invention is displaceable between a securing position engaging underneath the respective gutter and holding the leg to it and a freeing position permitting the leg to be lifted off the respective gutter. The latch means also prevents displacement of the securing means into its freeing position except when the locking element is in its lower position. This is achieved according to this invention by providing the securing means, which can be a simple angle fitting and bolt, only accessible when the respective leg subassembly is released. Thus not only cannot the roof rack be opened when the vehicle door is closed, but it cannot be removed either.

According to another feature of this invention one of the formations is a vertically open notch and the latch means includes a latch member jointly vertically displaceable with the locking element and carrying another of the formations which is vertically engageable in the notch. This latch member can be a transverse pin extending across the flanges of a channel-shaped latch member. The leg is an oppositely open channel so that the mechanism is enclosed in the locked position. For ease of operation the formations are further engageable in a latching position in which the holddown member is freely displaceable between the securing and freeing position and the locking element is out of the door opening. Spring means is provided for urging the formations into the latching position.

In order that the locking and latching positions be distinct, the formations include respective locking and latching notches in the leg. According to this invention one of the formations is formed by a spring deflectable by the other formation on movement of the holddown member into the locked position.

The latch means according to this invention includes a latch member carrying the locking element and pivotal between an outer positions with the formations disengaged and an inner position with the formations engaged. This latch member can also be slidable between an upper position with the formations disengaged and a lower position with the formations engaged. Spring menas urges the latch member into the upper position. The leg according to this invention can have a straight-line or arcuate guide in which the latch member is slidable.

For a two-door car the instant invention proposes roof-rack assembly having a pair of similar roof racks securable to the rain gutters of a motor-vehicle roof with one of the racks, normally the front rack, above a door opening of the vehicle. Such an arrangement is constructed as described above, but the rear rack is not provided with latch means identical with those of the front latch. Instead link means is provided extending from the latch means of the front rack to the respective holddown member of the rear rack for preventing displacement of same into the freeing position except when the holddown members of the front rack are in the freeing position.

This link means includes a rotatable rod extending between each leg of the roof front rack and the respective leg of the rear rack and respective pawls on the tube and at the legs of the racks engageable with at least one of the respective formations. According to this invention the pawls of the rear rack are moved into positions preventing the respective formations from disengaging when the formations of the front rack are in the locked positions.

DESCRIPTION OF THE DRAWING

The above and other features and advantages will become more readily apparent from the following, reference being made to the accompanying drawing in which:

FIG. 7 is a section like FIG. 2 but through the front rack of the second assembly according to this invention;

FIG. 8 is a section like FIG. 2 but through the rear rack of the second assembly according to this invention;

FIG. 9 is a view taken in the direction of arrow IX of FIG. 8;

FIG. 10 is a view of a detail of the second assembly according to the invention;

FIG. 15 is a section taken along line XV—XV or FIG. 14;

FIG. 16 is an exploded view of a detail of another variation on the third rack of FIGS. 11-13;

FIG. 17 is an end view of the detail of FIG. 16;

FIG. 18 is an end view of the third rack of FIGS. 11-13 but in open position;

SPECIFIC DESCRIPTION

Figure 1:
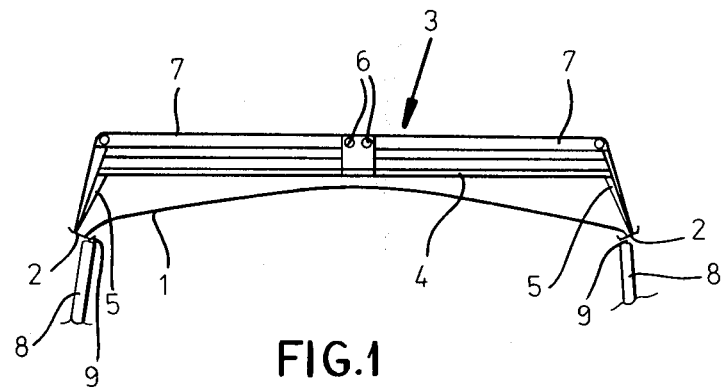
FIG. 1 is a simplified front view of a roof-rack assembly.
Figure 25:
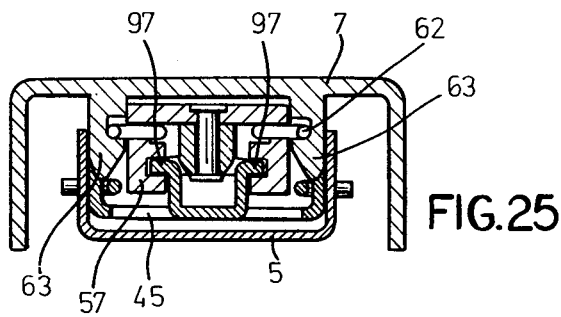
FIGS. 25, 26, and 27 are views taken respectively along lines XXV—XXV of FIG. 23, XXVI—XXVI of FIG. 24, and XXVII—XXVII of FIG. 23.

As seen in FIG. 1 a standard roof ski rack 3 sits on a motor-vehicle roof 1 and has a lower rail 4 and a pair of legs 5 sitting in the rain gutters 2 above the doors 8 that are situated in door openings 9. A pair of top or clamp rails 7 are pivoted at 6 in the center of the bottom rail 4. The upper and lower edges of the rails 4 and 7, respectively, are faced with rubber so they can grip an object such as a ski or skipole. This construction is standard.

Figure 2:
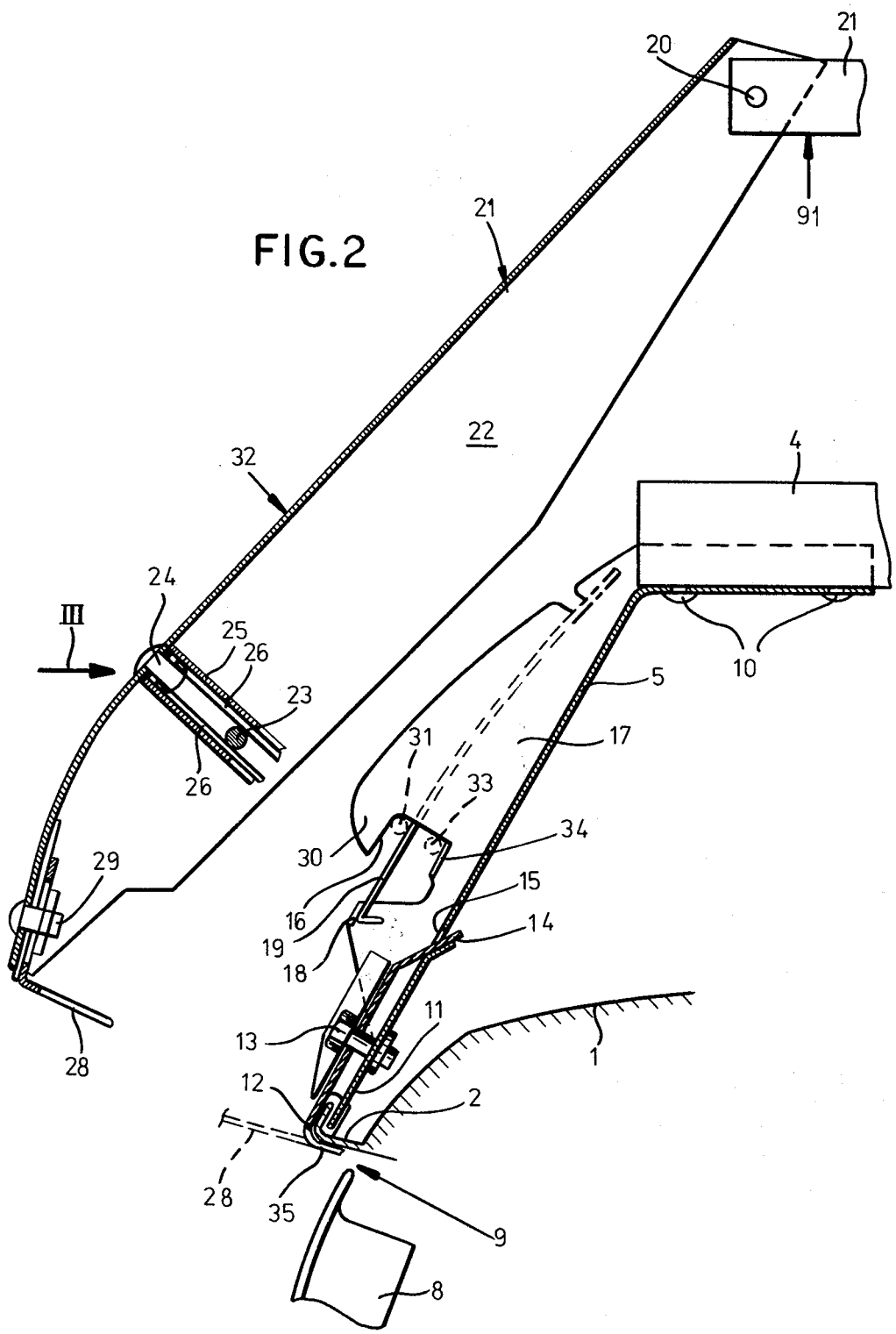
FIG. 2 is a large-scale vertical section through a detail of a first roof rack according to this invention.
Figure 3:
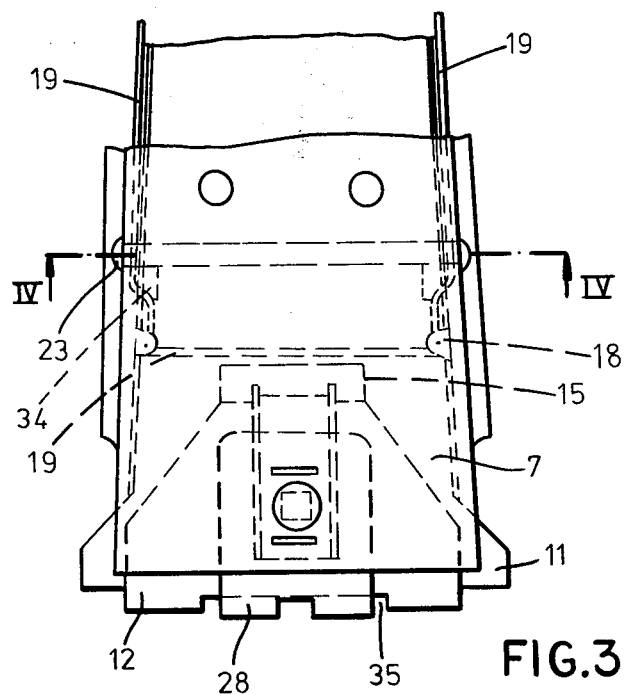
FIG. 3 is a view taken in the direction of arrow III of FIG. 2.
Figure 4:
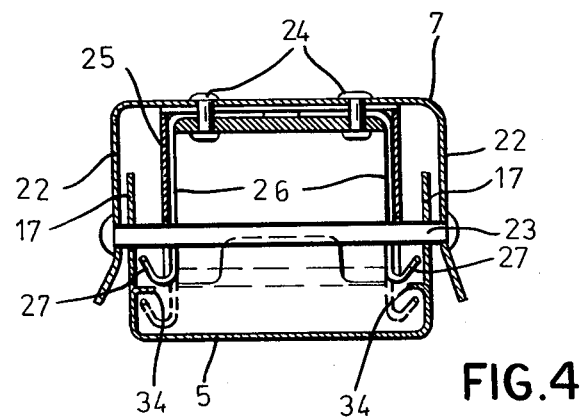
FIG. 4 is a section taken along line IV—IV of FIG. 3.

As shown in FIGS. 2, 3, and 4 each leg 5 is secured via rivets or bolts 10 to the respective end of the bottom rail and is U-shaped and outwardly open, having a pair of side flanges 17. At its lower end the leg 5 is formed with a widened region or foot 11 by means of which it sits in the gutter 2. An L-shaped clip 12 has a short lower leg engaged under the gutter 2 and is secured by a bolt 13 to the leg 5. An upper end 14 of the clip 12 passes through a guide hole 15 in the leg 5 to stabilize this clip 12 on the leg 5. Thus the gutter 2 can be snugly gripped between the normally plastic-coated surfaces of the foot 11 and clip 12 so the leg 5 is quite rigidly and securely attached to the gutter 2.

The flanges 17 of the leg 5 are each formed with a downwardly and outwardly open notch 16 defining an overhanging nose 30 and formed at its inner side, relative to the vehicle, with bent-in locking tabs 34 best seen in FIG. 4. A squared-off U-section leaf spring 19 has a pair of legs extending up along the flanges 17 and a bight bearing against bent-in tabs 18 formed in the flanges 17 below the cutouts 16 so that this spring 17 normally passes down along the middles of the cutouts 16.

The outer end of each upper rail 7 is pivoted at an axis 20 parallel to the direction of travel to an inwardly open U-section latch 21 having a pair of side flanges 22. The rail 7 itself is normally urged upward as indicated by arrow 91 by means of a torsion spring provided at its pivot 6. A latching bolt 23 is seated in the two flanges 22 and extends front-to-back therebetween, parallel to the travel direction. A sleeve or cup 25 is secured by rivets 24 within the U-section latch 7 inward of the flanges 22 thereof and is notched out at the pin 23. Wire springs 26 fit snugly inside this sleeve 25 and have legs extending parallel to the flanges 22 on each side of the pin 23 and formed with outwardly bent hooks or engagement formations 27 that can engage as will be described below behind the tabs 34. The rivets 24 also secure these springs 26 in place.

The lower end of the latch 21 is provided with an L-shaped locking element 28 having an upper flange formed with an elongated hole through which engages a bolt 29 and a lower flange that can engage in a slot 35 formed in the widened foot 11 of the leg 5 and into the door opening 9 as will be described below. The legs of this element 28 are of different lengths and are both formed with slots. In addition the element 28 can be mounted on either the inner or outer face of the leg 5 so it can be mounted in any of a plurality of positions to fit different vehicles.

In use the objects to be secured in place are positioned between the rails 4 and 7 and the rails 7 are pivoted down against the direction of arrow 91. The latch 21 of each rail 7 is pivoted in as indicated by arrow 32 as it is pulled down to enagage the pin 23 over the round outer side of the nose 30 and then up in the notch 16 into the position indicated at 31. In this position, which is shown in solid lines in FIG. 4, the roof rack is latched closed and the objects pinched between the rubber faces of the rails 4 and 7 are secure, but the device is not locked. In addition in this latching position the hooks 27 are not engaged behind the tabs 34, the springs 13 urge the latch 21 outward to prevent it from rattling, and the element 28 does not engage into the door opening.

The rack can be opened when in this latched but not locked position simply by pulling down on the latch 21 to pull the pin 23 out of the notch, and then swinging up the latch 21 against the direction of arrow 32.

To lock the roof rack when it is in the latched position, the latch 21 is pressed in the direction 32 with sufficient force to bend back the springs 19 and thereby move the pin 23 into the position indicated at 33, against the tabs 34 with the springs 19 bent. This action also snaps the four hooks 27 of the springs 26 behind the tabs 34 to hold the assembly in this position as indicated in dot-dash lines in FIG. 4, and engages the element 28 into the door opening 9 just above the door 8. Such locking of the roof rack can be done even while the door 8 is closed, as the element 28 is normally plastic coated like the foot 11 and clip 12 so it can poke into the door gasket without damaging it.

Assuming the door 8 is open, the latch can be disengaged from this locked position in the same manner as from the latched position, since relative longitudinal displacement sufficient to move the pin 23 out of the notch 16 will also move the hooks 27 down past the tabs 34. Of course sliding the latch 21 down like this, which is possible because of the rubber facings of the rails 4 and 7, also moves the element 28 vertically down from the upper edge of the door opening 9.

So long as the door 8 remains closed, however, it blocks any appreciable downward movement of the element 28 so the latch 21 cannot slide down on the leg 5 and the rack cannot be opened. In addition the two U-shaped elements 7 and 21 close on the nut of the screw 29 as well as on the bolt 13, so that the roof rack cannot be removed from the vehicle or made inoperable once it is locked. Similarly the lower flange of the locking element 28 is engaged in the notch 35 of the clip 12, so that it cannot be twisted to the side.

Thus with a properly installed rack it is possible to very solidly secure valuables in place atop the car and yet gain acces to them merely by opening the car door. The locking system is extremely robust, yet is quite simple, and it does not require the use of a special combination or key.

Figure 5:
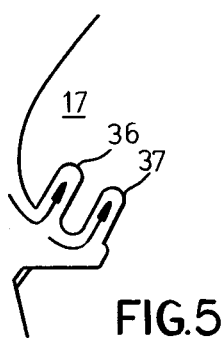
FIG. 5 is a diagrammatic view illustrating a variant on the rack of FIGS. 1-4.

FIG. 5 shows a variation on the system wherein each flange 17 is formed with two notches 36 and 37 opening parallel to the leg 5, instead of a single notch 16. These notches 36 and 37 define the positions 31 and 33 and reduce the need for the spring 19 as well as for the springs with their hooks 27 and the tabs 34. This system is simpler and cheaper to manufacture than the arrangement described with reference to FIGS. 2-4, but it requires the user to have the door open both during opening and closing of the roof rack.

Figure 6:
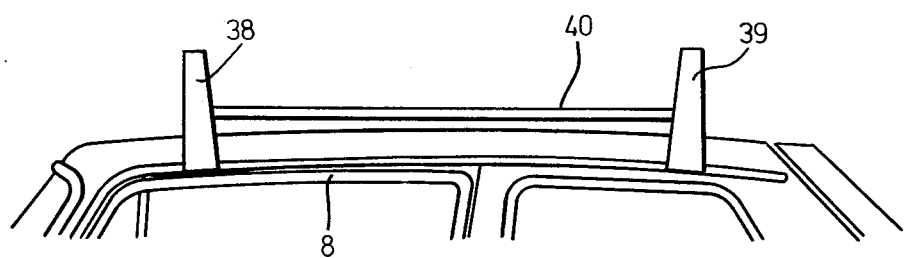
FIG. 6 is a side view of a second rack assembly according to the invention.

FIG. 6 shows a front roof rack and a rear roof rack 39. The front rack 38 is over a door 8, but the rear one is not. A link 40 is provided to lock the rear rack 39 when the front rack 38 is locked and to gang the two racks 38 and 39 in other ways. The structure in the front rack 38 that accomplishes this is seen in FIG. 7 and that of the rear rack 39 in FIG. 8. In all other respects the racks are identical to the structures defined with reference to FIGS. 2-5.

More particularly FIG. 7 illustrates how the front rack 38 is constituted as shown in FIG. 5, that is with two notches 36 and 37 and no springs 26. In addition the link rod 40 is journaled in clips 44 (FIG. 10) underneath the leg 5 and is urged clockwise as seen in FIGS. 7 and 8 by an unillustrated torsion spring. At the front rack 37 the link rod 40 is provided with a pawl 41 projecting into the U-section leg 5 through a hole 95 lined with a grommet 96. This pawl 41 projects down into the region of the notches 36 and 37 and can pivot past them. It is urged outward by the spring 19.

As illustrated in FIGS. 8 and 9 (which respectively show the left- and right-hand ends of the same roof rack) the leg 5 of the rear rack 39 is also formed as shown in FIG. 5. The link 40, which is a torsion-resisting tube, is also journaled at clips 44 at this rear rack 39, but carries a pawl 42 like the pawl 41, but having at its lower outer end a hook 43. The relative angular positions of these two pawls 41 and 42 are set such that when the front rack 38 is latched but not locked the hook 43 engages under the notch 36, blocking movement of the pin 23 into or out of this notch 36 but permitting it to move into and out of the inner locking notch 37. When the front rack is locked the hook 43 is engaged as shown in dot-dash lines under the inner notch 37.

Thus with this type of rack assembly the rear rack 39 is first closed and either latched or locked. It cannot be latched if the front one is already latched or locked though, but can be locked if the front one is latched. The front rack 38 is then latched or locked, which action locks the rear rack by engaging the hook 43 under the pin 23. The front rack 38 cannot, however, be locked when the rear rack 39 is merely latched, however.

Figure 11:
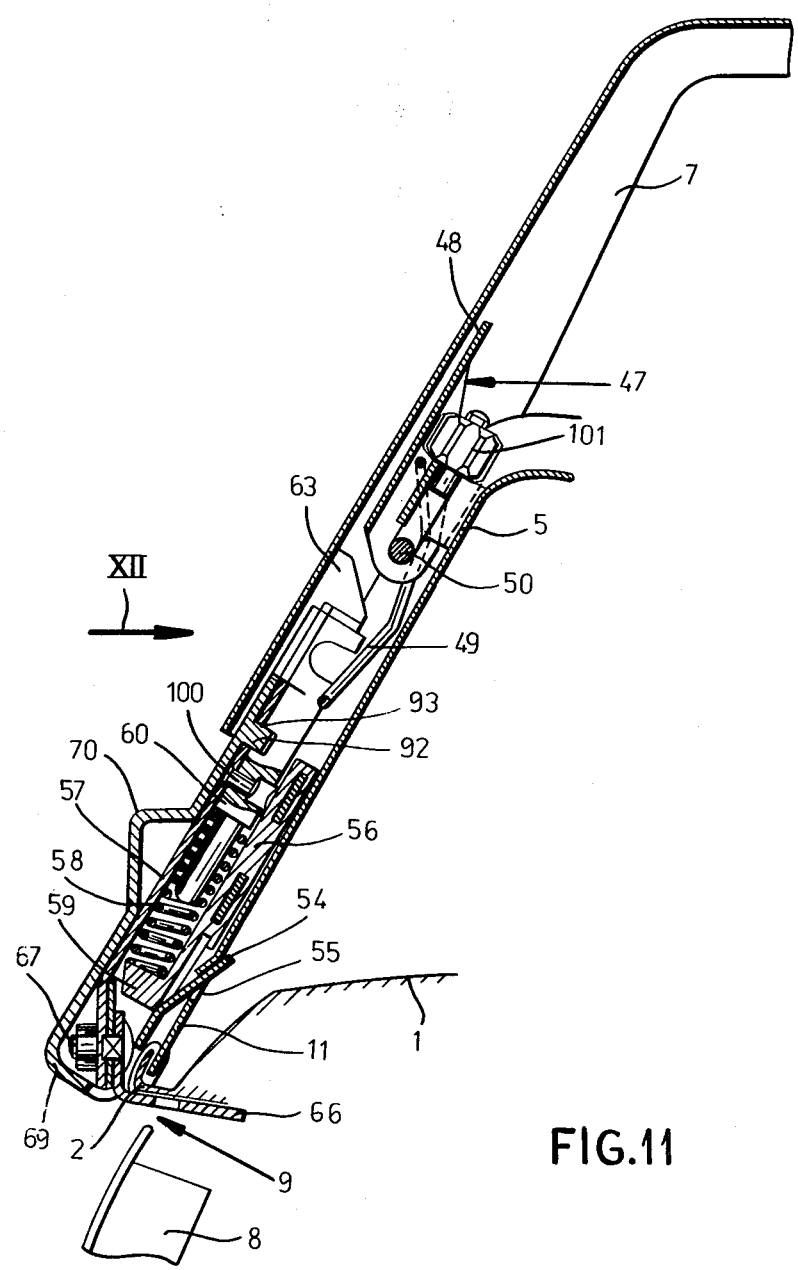
FIG. 11 is a section like FIGS. 2 and 7 but through a third rack according to the present invention.
Figure 12:
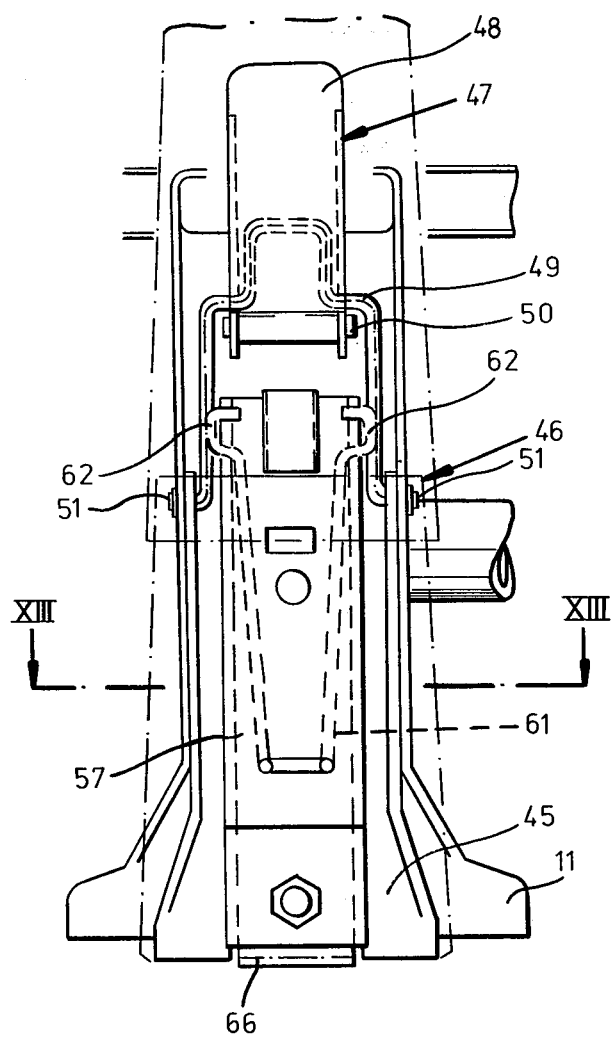
FIG. 12 is a view taken in the direction of arrow XII of FIG. 11 but with some parts removed for clarity of view.
Figure 13:
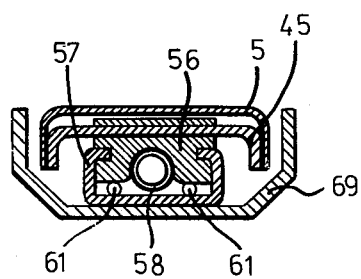
FIG. 13 is a section taken along line XIII—XIII of FIG. 12.
Figure 14:
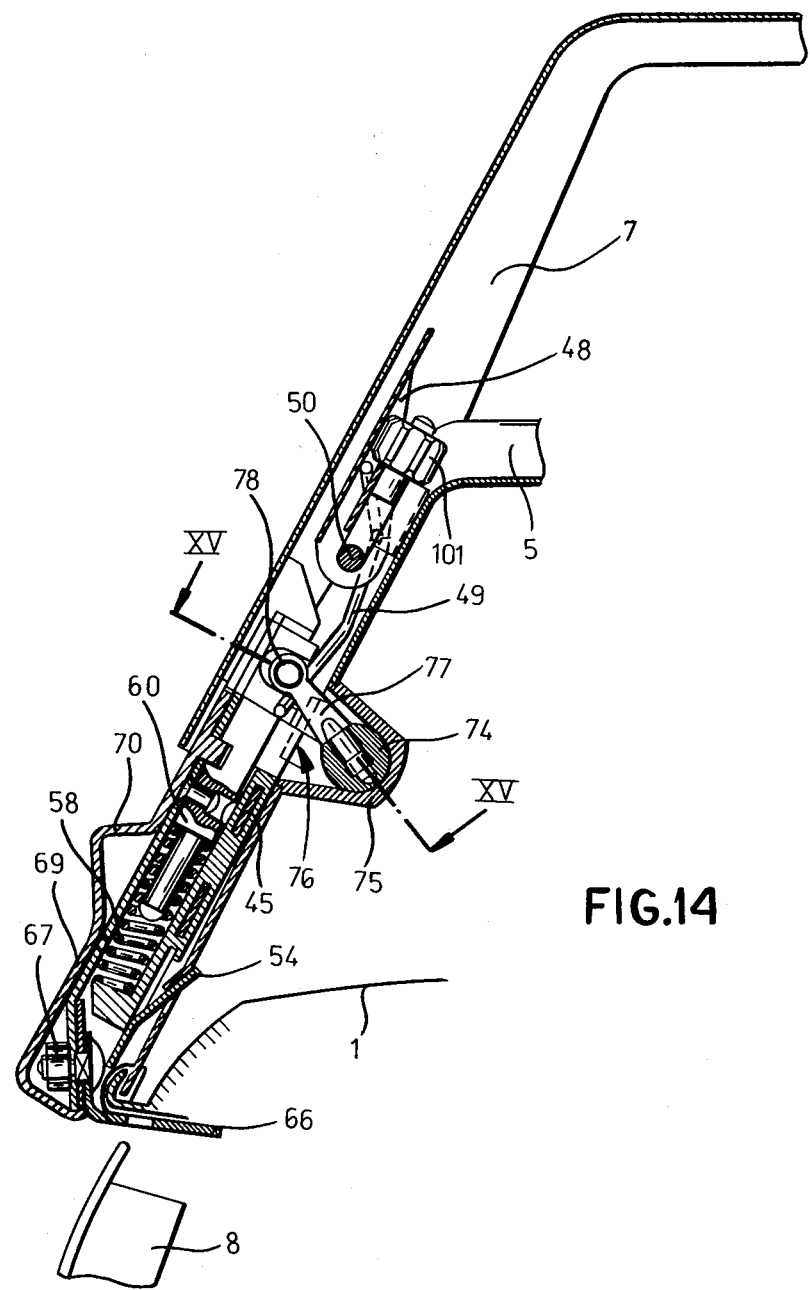
FIG. 14 is a section like FIGS. 2, 7 and 11 but through a variation on the third rack of FIGS. 11-13.
Figure 19:
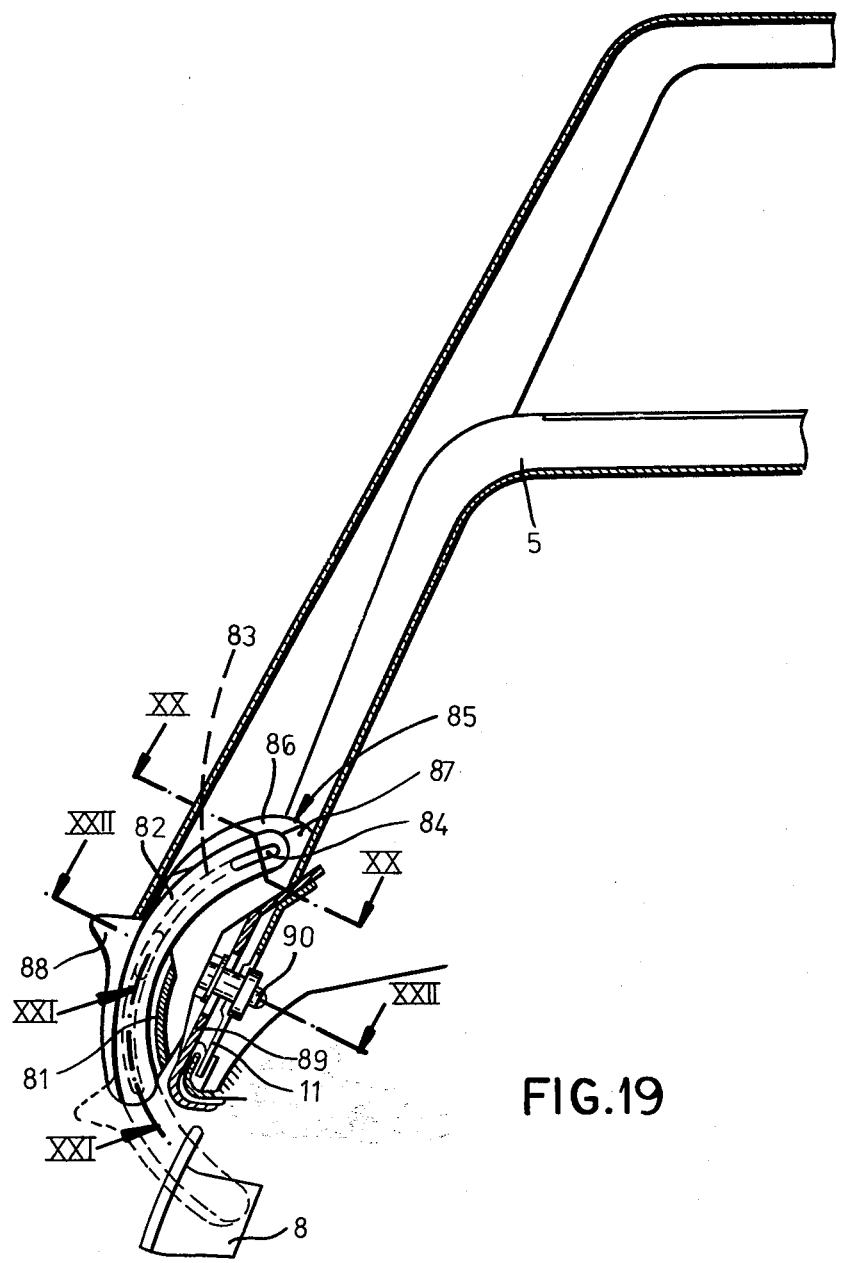
FIG. 19 is a section like FIGS. 2, 7, 11, and 14 but through a fourth rack according to this invention.
Figure 20:
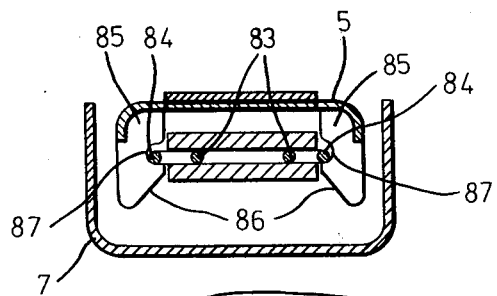
FIGS. 20, 21, and 22 are sections taken respectively along lines XX—XX, XXI—XXI, and XXII—XXII of FIG. 19.
Figure 21:
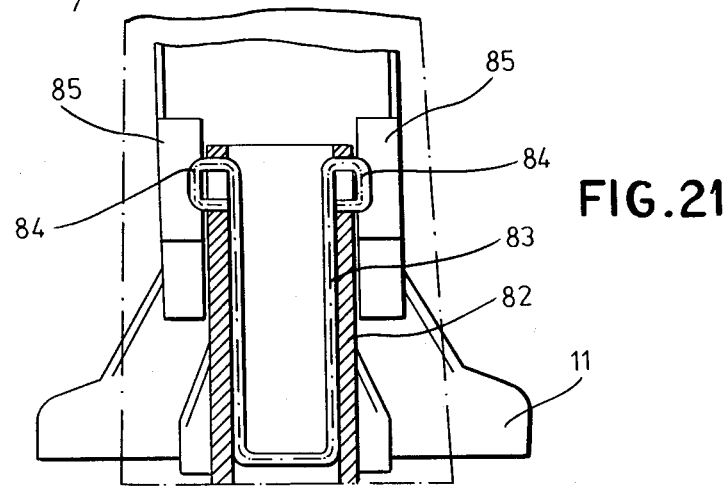
Figure 22:
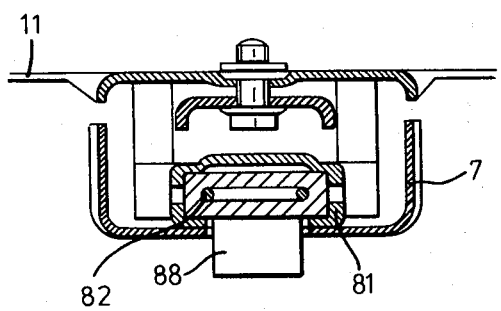
Figure 26:
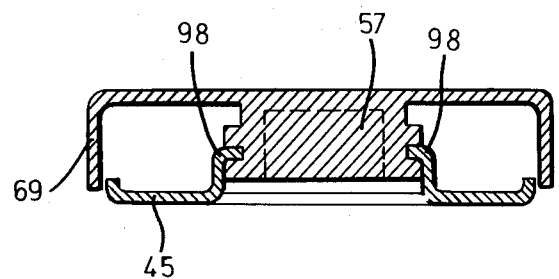
Figure 23:
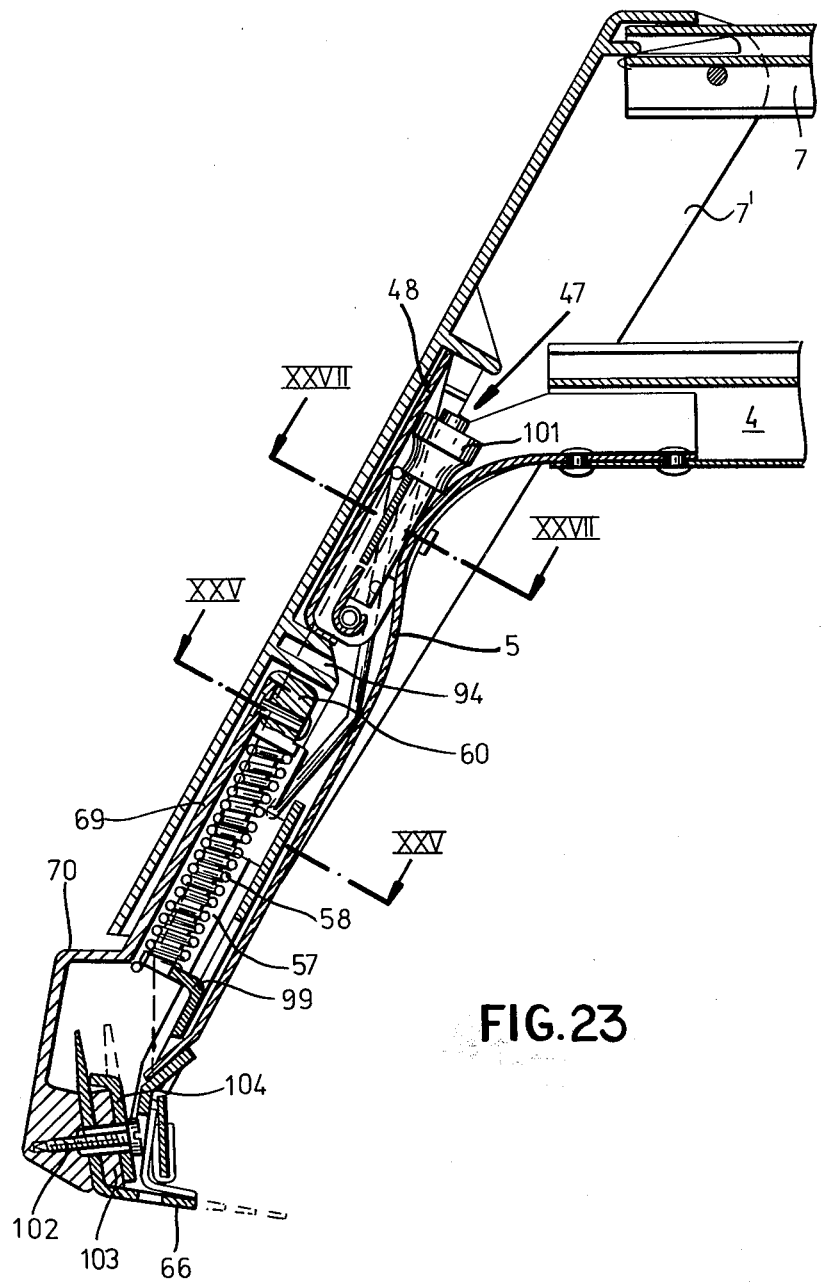
FIG. 23 is a section like FIGS. 2, 7, 11, 14, and 13 but through a fifth rack according to this invention.
Figure 24:
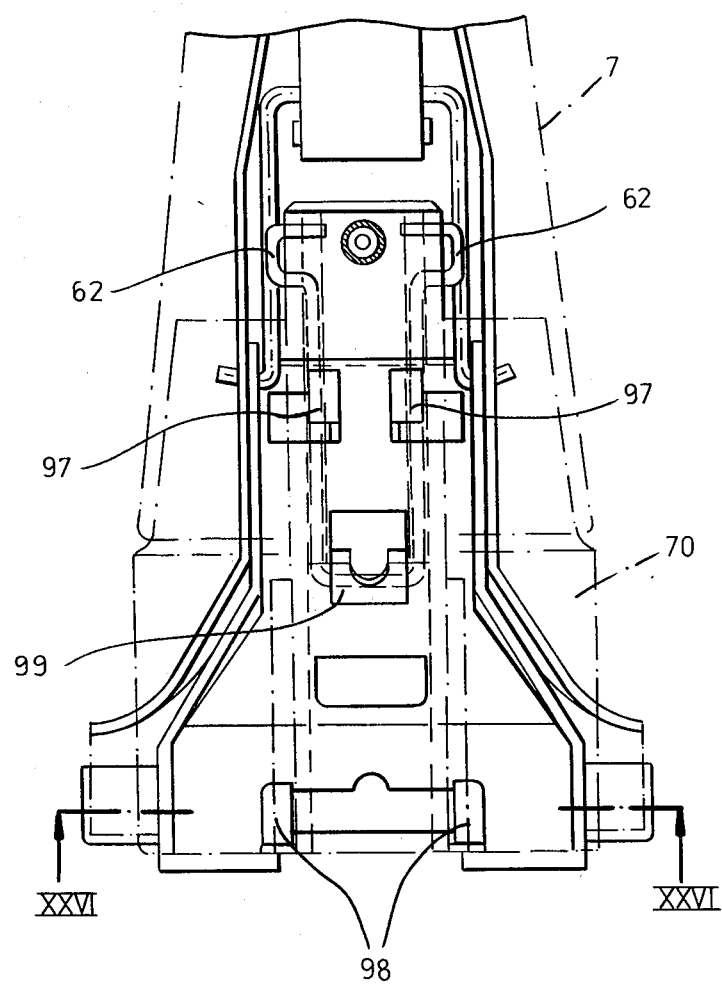
FIG. 24 is a view taken in the direction of arrow XXIV of FIG. 23.

In the roof-rack assembly of FIGS. 11-18 each leg 5 is of U-section and has a lower end formed as the foot 11. A clip or locking flange 45 that engages under the gutter 2 in which the foot 11 sits is of similar U-section and is received in the leg 5 as best seen in FIG. 13. This clip 45 has a tongue 54 that can engage upward and inward through a guide window 55 in the inner floor of the U-section leg 5 as seen in FIG. 11. In addition its flanges at the upper ends are transfixed by the ends 51 of a spring wire 49. As shown in FIG. 18 the outer ends of these end portions 51 engage through slots 52 in the flanges of the leg 5, so that the clip 45 can both pivot about the axis defined by the ends 51 and slide along the leg 5 to the extent permitted by the slots 52.

A mounting mechanism 47 has a lever 48 pivoted at an axle 50 on the leg 5 and is traversed by the spring 49 at a location offset from this axle 50. Thus pivoting of the lever 48 in the direction of arrow 53 (FIG. 18) between the out unlocked position (FIG. 18) to the locked position of FIG. 11 will displace the ends 51 along the slots 52 and slide the clip 45 up on the leg 5. If the clip 45 is meanwhile lying against the leg 5 and the foot 11 is sitting in the gutter 2, this movement will bring the lower end of the clip 45 solidly up under the gutter 2 to lock the leg 5 securely in place thereon. Such movement can only be done when the rack is in the fully open position, as otherwise the lever 48 is wholly enclosed in its structure and externally inaccessible. A nut 101 can displace the pivot 50 limitedly along the leg 5 to allow adjustment of the end posiion of the clip 45 on the leg 5 to fit different rain gutters.

Fixed to the clip 45, and indeed to the leg 5 when the clip 45 is locked on the gutter 2 as described above, is a guide rail 56 along which a latch body 57 shaped as an omega-section channel can slide parallel to the leg 5. A compression spring 58 is braced at its lower end against an abutment 59 formed on the guide 56 and at its upper end on an abutment 60 secured by a screw 100 to the latch 57 so as continuously to urge this latch 57 upward, into the locked position. An L-shaped locking element 66 comparable to the elemnt 28 described above is secured by a bolt and nut 67 to the lower end of tis latch 57 and can engage through the clip 45 and into the door opening 9. This bolt is of square section immediately underneath its head and fits tightly in a square section hole in the latch 57 and in a slot in the element 66 so it cannot rotate therein as the nut 67 is tightened. In addition the upper flange of the element 66 is recessed between the flanges of the latch 57 so it cannot become twisted relative thereto.

The entire above-described system is closed by a cover 69 formed with a convenient pull handle or grip 70. At its lower end the cover 69 is hooked up over the lower end of the latch 57, and at its upper end it fits with a short projection 92 into a hole 93 of the latch 57 so it is solidly connected thereto yet readily removable when the latch is in the open position and not covered by the lower end of the rail 7.

The rail 7 itself as also shown in FIG. 7 is a U-section and open toward the U-section leg 6. It is provided internally at its lower end with a pair of wedge blocks 63 shown in FIGS. 11 and 15 which are formed with camming surfaces 64 that diverge inward toward the leg 5 and with confronting slots 65.

A generally U-shaped wire spring 61 lying generally in a plane is captured between the guide 56 and the sliding latch 57 and has upper ends 62 that normally diverge outward from the latch 57 and then engage inward solidly in the latch 57. These ends 62 can be pressed into the latch 57, but move longitudinally, here generally vertically, with the latch 57.

The wedge blocks 63 and spring ends 62 are positioned so that they engage each other as the lever 7 is pivoted down over the leg 5, so long as the clip 45 is locked in place by pivoting-up of the lever 48 and the latch 57 is in its upper locked position. This engagement first cams the two ends 62 in by means of the wedge faces 64, and then allows these ends 62 to snap out into the grooves 65, which action locks the end of the rail 7 on the leg 5.

If the vehicle door 8 is open, the rack can be opened by pulling down on the handle 70, thereby sliding the latch 57 and locking element 62 down on the guide 56 to slide the spring ends 62 down out of the grooves 62, thereby allowing the rail 7 to pivot up. This action takes place without moving the clip 45 on which the latch 57 slides.

If however the door 8 is closed, downward travel of the element 66 and latch 57 is impeded and the spring ends 42 cannot be slid down out of the grooves 65. The rail 7 therefore remains solidly locked down.

Modification of this unit for a two-door car in the manner described with reference to FIGS. 6-10 is illustrated in FIGS. 14-18, in which the same references as used in FIGS. 11-13 are employed for identical structure.

The inner wall of the leg 5 of the rack above the door opening, normally the front rack, and the other rack is formed with a window 76 into which fits a ball seat 75 with, as seen in FIG. 15, its inner end snapped into the opening 78 and the guide 56 in turn fitting into it so that it cannot be pried off. This seat 75 receives a ball 74 carried on a rearwardly projecting fitting of the front rack and a forwardly projecting fitting 72 of the rear rack. A torque-transmitting link tube 71 extends front-to-back, that is in the travel direction, between and engages into the two fittings 72. A key 73 inside each fitting 72 rotationally couples the it to the tube 71 while permiting limited relative movement along the tube axis. Such a system is provided to interconnect the front and rear rack on each side. Each ball 74 carries an arm 77 projecting outwardly through the respective aperture 76.

On the rack positioned over a door opening, usually the front rack, the abutment 60 is replaced by an abutment 60' formed as seen in FIGS. 16 and 17 as a lower piece 79 that is bolted to the latch 57 and that serves as the abutment for the spring 58, and an upper part 80 wholly separate therefrom and normally spaced therefrom by a distance M. This upper part 80 is fixed on the leg 7 and is formed with a cutout 78 opening inward away from the cover 69. In addition this part 80 is shaped complementarily to the latch 57 so it can slide therealong. The outer end of the respective arm 77 fits in this cutout 78 when the rail 7 of the front rack is swung down and locked, thereby rotaionally immobilizing the link 71.

In the rear rack the abutment 60 that is fixed to the latch 57 is formed of a single piece with a rearwardly open cutout 78 into which engages the respective arm 77 extending perpendicular to the tube axis from the respective ball 74. Thus the latch 57 of the rear rack can only slide from the upper closed position to the lower open position when the tube 71 is free to pivot. The relative angular postiions of the arms 77 are therefore such that the rear rack can only be opened when the front rack is opened, and the front rack can only open when the respective vehicle door itself is open and the opening 9 is clear.

Of course if identical one-piece abutments 60 are provided in both the front and rear racks, their locking and unlocking action would be ganged.

The arrangement of FIGS. 19-22 has an arcuate latch bolt 82 received in a complementarily arcuate guide 81 formed right in the upper rail 7. This bolt 82 is slidable along the arcuate guide 81, normally urged upward therein by an unillustrated tension spring, and has a handle 88 projecting through a window or slot in the outer side of the inwardly U-section rail 7.

The leg 5 is provided with a pair of wedge blocks 85 having outwardly diverging camming surfaces 86 and confronting grooves 87. A spring 83 fitted in the slide has ends 84 that normally project from it.

In a manner similar to that of the spring 62 of FIGS. 11-13, when the rail 7 is pivoted down onto the leg 5 the surfaces 86 cam in the spring ends 84 which then snap out in the grooves 87. This action solidly locks the rail 7 on the leg 5.

To release the rail 7 one pulls down on the handle 88 to slide the latch 82 down until the spring ends 84 pull out of the grooves 87. This action is only possible when the door 8 is not blocking the door opening 9, as when closed the door 8 prevents the latch 82 from moving far enough to disengage the blocks 85.

In this arrangement a relatively simple clip 89 is provided with is secured by a simple bolt 90 to the inner wall of the leg 5. Such a roof carrier can therefore be made relatively cheaply, yet will solidly resist opening or removal unless the vehicle door is open.

The arrangement of FIGS. 23-26 functions similarly to that of FIGS. 11-18, with identical reference numerals identifying functionally identical structure. Here an outer end 7' of the rail 7 is pivotal like the latch 21 on this rail 7 and is unitarily formed with the wedge blocks 63. The latch 57 is unitarily formed with the cover 69, whereas the leg 5 is stamped of sheet metal and unitarily formed with rails 97 and 98 on which the latch 57 slides and an abutment 99 for the lower end of th spring 58. In addition the leg end 7' is unitarily formed with an abutment 94 that bears upward against the bottom of the lever 48 in the closed position so the closing forces are mainly born by this abutment 94, rather than solely by the spring ends 62. The element 66 is secured in place by a self-tapping screw 102, spacer 103, and plate 104 that can be shifted around to achieve the four different extensions of the element 6 illustrated in FIG. 23 in dashed lines.

In the system according to this invention the latch always serves two purposes, preventing the rack from being opened and preventing it from being removed from the vehicle by an unauthorized person. The latter purpose only need be fulfilled when the legs 5 are on a roof-rack container. In this case the element 21, for instance, is simply pivoted right on the leg 5 and serves merely to cover up the mechanism by means of which the leg 5 is secured to the gutter 2.

Figure 27:
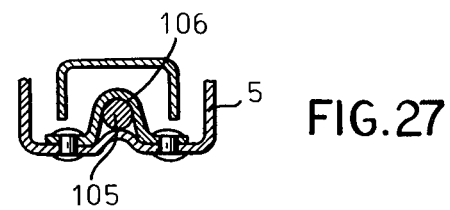

FIG. 27 also shows how the adjustment nut 101 has a shaft 105 threaded under a bracket 106 on the leg 5 to allow the posiion of the pivot 50 to be adjusted.

Any feature of any embodiment can be combined with features of other embodiments without departing from the scope of the invention. For example in the FIGS. 2-10 embodiment the recess 16 and tabs 34 can be formed by bending in the clip 12. In addition a tightener can be provided for the clip 12, with the recess 16 and tabs 34 carried right on the tensioning arrangement, or the tabs 34 could be provided directly on the leg 5.

I claim:

1. In a roof rack securable to the rain gutters of a motor-vehicle roof above the door openings, a leg subassembly comprising:
    a support;
    a leg standing in the gutter above the respective door opening and carrying the support;
    means on the leg for securing same on the respective gutter;
    a holddown member pivoted on the support and displaceable between a locking position close to same for securing an object to the support and a freeing position spaced from the support;
    a locking element extending into the respective door opening underneath the leg and vertically displaceable relative thereto between an upper position relatively close underneath the respective gutter and a lower position spaced downward therefrom, whereby the locking element can only move into the respective lower position when the respective door is not closed in the respective door opening; and
    latch means including formations engageable in the upper position of the locking element and connected to the holddown member for preventing displacement of same into the freeing position except when the locking element is in the lower position.

2. The roof rack defined in claim 1 wherein the securing means is displaceable between a securing position engaging underneath the respective gutter and holding the leg to it and a freeing position permitting the leg to be lifted off the respective gutter, the latch means also preventing displacement of the securing means into its freeing position except when the locking element is in its lower position.

3. The roof rack defined in claim 1 wherein one of the formations is a vertically open notch and the latch means includes a latch member jointly vertically displaceable with the locking element and carrying another of the formations which is vertically engageable in the notch.

4. The roof rack defined in claim 3 wherein the formations are further engageable in a latching position in which the holddown member is freely displaceable between the securing and freeing position and the locking element is out of the door opening.

5. The roof rack defined in claim 4, further comprising spring means for urging the formations into the latching position.

6. The roof rack defined in claim 5 wherein the formations include respective locking and latching notches in the leg.

7. The roof rack defined in claim 4 wherein one of the formations is formed by a spring deflectable by the other formation on movement of the holddown member into the locked position.

8. The roof rack defined in claim 1 wherein the latch means includes a latch member carrying the locking element and pivotal between an outer positions with the formations disengaged and an inner position with the formations engaged.

9. The roof rack defined in claim 1 wherein the latch means includes a latch member carrying the locking element and slidable between an upper position with the formations disengaged and a lower position with the formations engaged.

10. The roof rack defined in claim 9, further comprising spring menas for urging the latch member into the upper position.

11. The roof rack defined in claim 11 wherein the leg is provided with a straight-line guide in which the latch member is slidable.

12. The roof rack defined in claim 11 wherein the leg is provided with an arcuate guide in which the latch member is slidable and the latch member has a lower end forming the element.

13. A roof-rack assembly having a pair of similar roof racks securable to the rain gutters of a motor-vehicle roof with one of the racks above a door opening of the vehicle, the assembly comprising:
    a pair of respective supports;
    respective pairs of legs standing in the gutter and carrying the respective supports, one of the pairs of legs being above the respective door opening;
    means on the legs for securing same on the respective gutters;
    respective holddown member pivoted on the supports above the respective legs and each displaceable between a locking position close to the respective support for securing an object to same and a freeing position spaced from the respective support;
    respective locking elements on the rack above the door openings extending into the respective door openings underneath the respective leg and vertically displaceable relative thereto between an upper position relatively close underneath the respective gutter and a lower position spaced downward therefrom, whereby the respective locking elements can only move into the respective lower positions when the respective doors are not closed in the respective door openings;

respective latch means on the rack above the door openings including formations engageable in the upper position of the respective locking elements and connected to the respective holddown members for preventing displacement of same into the freeing position except when the respective locking elements are in the lower position;

respective link means extending from the latch means of the rack above the door openings to the respective holddown member of the other rack for preventing displacement of same into the freeing position except when the holddown members of the rack above the door openings are in the freeing position.

14. The roof-rack assembly defined in claim 13 wherein the link means includes a rotatable rod extending between each leg of the roof rack above the door openings and the respective leg of the other rack.

15. The roof-rack assembly defined in claim 14 wherein the link means includes respective pawls on the legs of the racks engageable with at least one of the respective formations.

16. The roof-rack assembly defined in claim 15 wherein the pawls of the other rack are moved into positions preventing the respective formations from disengaging when the formations of the rack above the door openings are in the locked positions.

* * * * *